H. W. WATSON.
AUTOMOBILE JACK.
APPLICATION FILED APR. 23, 1915.
1,209,085.
Patented Dec. 19, 1916.
2 SHEETS—SHEET 1.
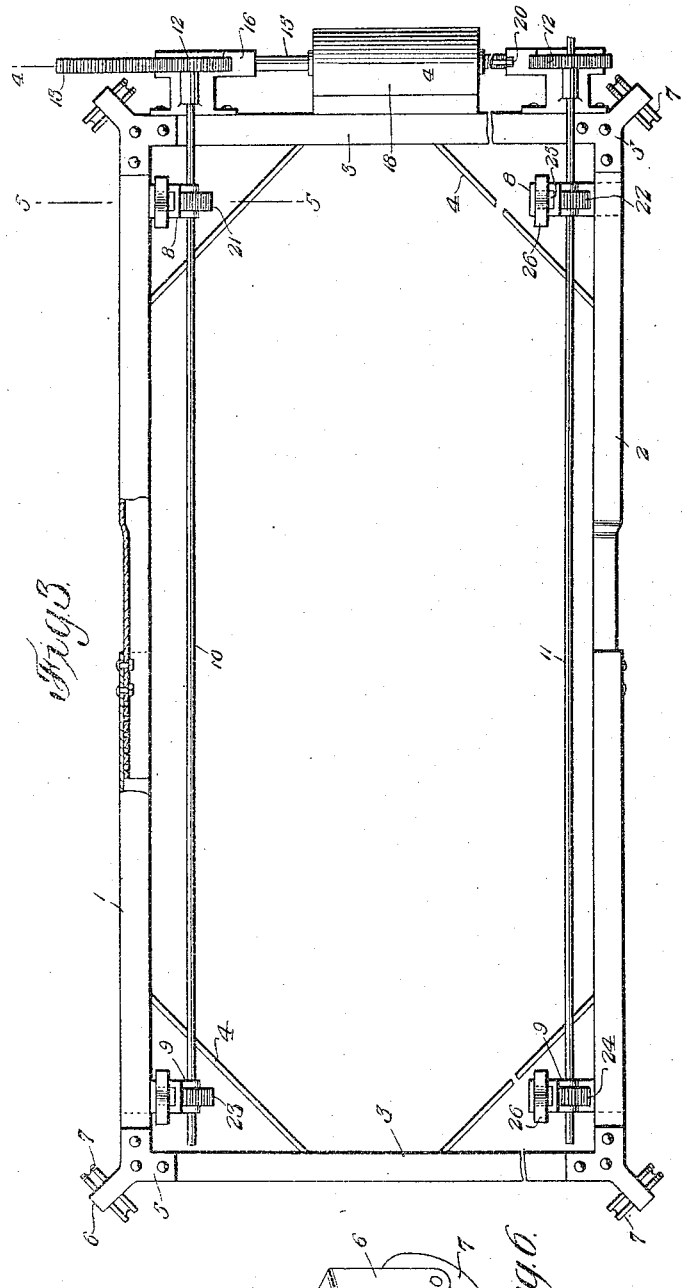
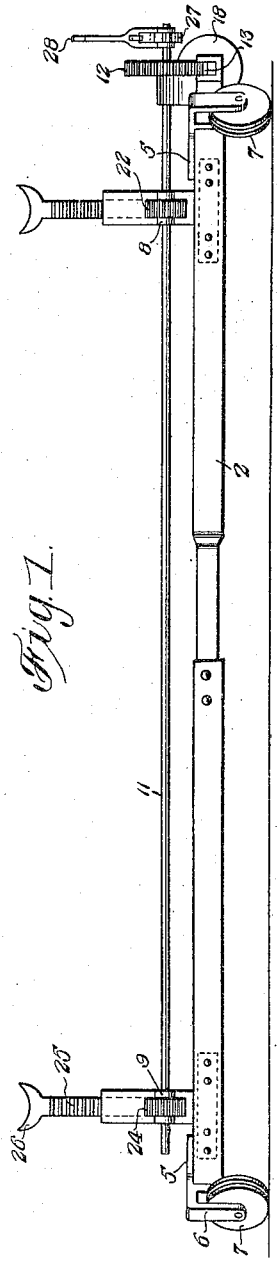
Witnesses
J. H. Crawford
O. Edwouston Jr.
Inventor
H. W. Watson,
By Victor J. Evans
Attorney

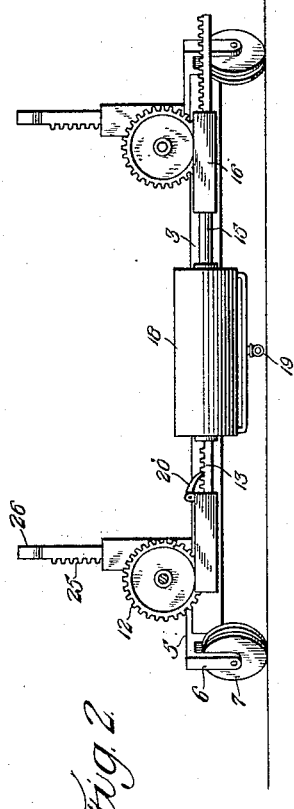
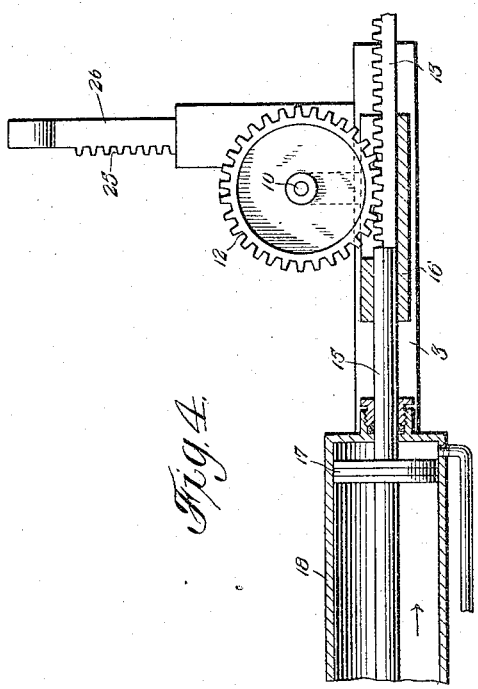
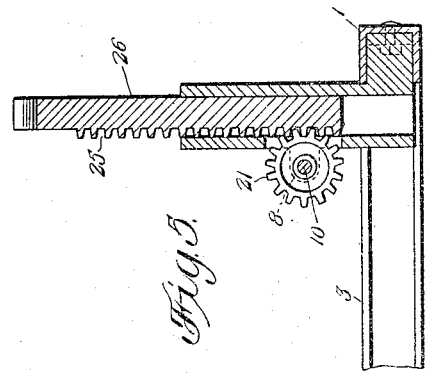

UNITED STATES PATENT OFFICE.

HARRY W. WATSON, OF MEMPHIS, TENNESSEE.

AUTOMOBILE-JACK.

1,209,085.  Specification of Letters Patent.  Patented Dec. 19, 1916.

Application filed April 23, 1915. Serial No. 23,410.

*To all whom it may concern:*

Be it known that I, HARRY W. WATSON, a citizen of the United States, residing at Memphis, in the county of Shelby and State of Tennessee, have invented new and useful Improvements in Automobile-Jacks, of which the following is a specification.

This invention relates to jacks and more particularly to automobile jacks, and the principal object of the invention is to provide simple and efficient mechanism operated from a central or common point for raising all four wheels of an automobile or other similar vehicle off the ground simultaneously.

Another object of the invention is to provide a device of this character wherein the entire vehicle is bodily raised from the ground and wherein the several parts are so arranged that they may be conveniently adjusted so as to arrange the jack plungers against vehicles of different sizes.

In garages, private as well as public, air tanks are provided for inflating the tires and for accomplishing other work such as blowing dust off the machine.

It is an object of this invention to provide a jack of the type described which may utilize the compressed air from these tanks for the purpose of elevating all of the jack plungers simultaneously from a common pressure cylinder, the piston thereof being adapted to be operated also by a hand pump.

It is another object of the invention to provide a device of this character which may be actuated either by air pressure from any suitable source of supply or manually from a common point by the application of a ratchet lever or other similar device.

It is still another object of this invention to provide a device of this character employing a plurality of simultaneously actuated jacks which are carried upon a frame, made either portable or mounted to rotate upon circular tracks whereby the automobile may be turned around so as to be headed out of the garage when desired.

Further objects of the invention will appear as the following description is read in connection with the accompanying drawing, which forms a part of this application, and in which:—

Figure 1 is a side elevation. Fig. 2 is a front elevation. Fig. 3 is a top plan view. Fig. 4 is a detail vertical sectional view on the line 4—4 of Fig. 3. Fig. 5 is a similar view on the line 5—5 of Fig. 3. Fig. 6 is a perspective view of one of the caster wheels showing a modified form of wheel for use on circular tracks.

In the specific embodiment of the invention as illustrated herein, I have shown a rectangular frame consisting of adjustable side bars 1 and 2 and end pieces 3 connected together by the diagonal braces 4 and the corner castings 5. These corner castings as shown carry angularly disposed spaced ears 6 in which are journaled supporting wheels 7, either flat or grooved as is desired, the latter form being provided for use where the device is employed upon a circular track.

Mounted in suitable bearings 8 and 9 at opposite ends of the frame on opposite sides thereof are a pair of shafts 10 and 11, both of which have keyed thereto at their forward ends the pinions or gears 12 which are in mesh with rack bars 13 formed at opposite ends of the piston rod 15. These rack bars are slidably mounted in bearings 16 and the piston rod carries a suitable head 17 which travels in a cylinder 18 secured to the forward end piece 3. This cylinder is supplied with a three-way valve 19 having means for the attachment of an air hose or pump and having an outlet by which the pressure in the cylinder may be vented when the valve is turned in the proper direction. The gears 12 are preferably held in adjusted position by a pawl 20 which, as will be readily understood, locks both shafts against movement in a retrograde direction after once being turned by the operation of the piston rod 15.

Secured upon each shaft 10 and 11 adjacent its forward end are gears 21 and 22 and splined upon each shaft adjacent its rear end are gears 23 and 24. All of these gears are in mesh with rack bars 25 formed on the jack plungers 26 whose heads are recessed as shown to receive the axles of the automobile or other vehicle to be raised.

When a grooved wheel and circular track are employed the automobile or other vehicle is run over the device and the jack plungers are in lowered position and the frame adjusted by lengthening the side pieces 1 and 2 until the jacks at the respective ends of the device are arranged beneath the axles of the machine, the shafts 10 and 11 sliding through the gears 23 and 24, as will be readily understood. Air under pressure is then admitted to the cylinder which causes the piston rod to travel in the direction of the arrow indicated in Fig. 4 which will thus shift the piston rod and through the rack bars rotate the gears 12 and shafts 10 and 11. This rotation of the shaft causes the elevation of the jack plungers and the simultaneous lifting of all four wheels of the vehicle from the ground. The automobile or other vehicle may be then turned around in any desired position for washing or repair of any of the parts and if desired the automobile may be operated by running the engine so as to test the same before lowering to the ground. Where the device is designed for use in any part of the garage the caster wheels 7 are made with flat peripheries and the device may then be pushed beneath the automobile or other vehicle and the jack plungers elevated as before.

If desirable, I may have splined upon either the shaft 10 or 11, the latter as shown in the drawing, a ratchet wheel 27 operated by a ratchet lever 28. By shifting this lever back and forth in a well known manner the shaft 11 may be turned in the proper direction and through the piston rod 15 the opposite shaft 10 correspondingly turned. If an entire hand operated device were required it is of course understood that the cylinder would be omitted and the piston would be in the form of a connecting rod between the two rack bars 13. When, however, the air cylinder is used the lever 28 and pinion 27 are preferably removed.

Not only is a device of this character convenient for repairing parts of the vehicle and tires and for trying out the engine and working parts of the machine while in the garage, but it will be found especially valuable for holding the machine elevated above the floor and thereby relieving the pressure from the new tires while the machine is in the garage.

What is claimed is:—

In a device of the class described in combination, a rectangular frame, a pair of elongated bearings having rectangular members secured against one of the sides of said rectangular frame, said bearings being arranged in alinement, each of said bearings having a cylindrical bore at its inner end and being open at the top at its outer end, a rod slidably guided in the cylindrical bores of said bearings and having integral rack bars formed at its opposite ends, said rack bars being adapted to engage the bottom of said bearings in slidable relation, an integral collar formed upon the rectangular members of said bearings, a shaft passing through each of said collars at right angles to said bearings, a gear fixed on each of said shafts, contacting said collars and projecting into the top of one of said bearings with its teeth in mesh with the teeth of the rack bars therein, each of said rack bars adapted to slide through said cylindrical bores, means for reciprocating said rod so as to actuate said rack bars, and a pawl pivoted upon one of said bearings, and adapted to engage with one of said rack bars.

In testimony whereof I affix my signature in presence of two witnesses.

HARRY W. WATSON.

Witnesses:
S. B. MASSEY,
L. F. MCCONNELL.

Copies of this patent may be obtained for five cents each, by addressing the "Commissioner of Patents. Washington, D. C."